April 15, 1941.　　　L. DE FLOREZ ET AL　　　2,238,718
INDICATING INSTRUMENT
Filed Feb. 23, 1938　　　2 Sheets-Sheet 1

LUIS DE FLOREZ
EMMON BACH
INVENTORS

BY
ATTORNEY

April 15, 1941.    L. DE FLOREZ ET AL    2,238,718
INDICATING INSTRUMENT
Filed Feb. 23, 1938    2 Sheets-Sheet 2
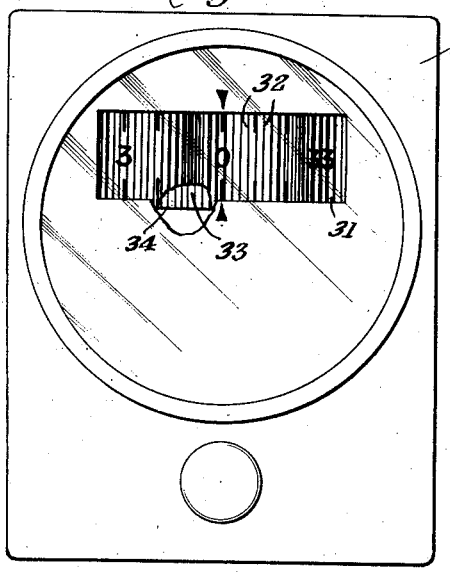
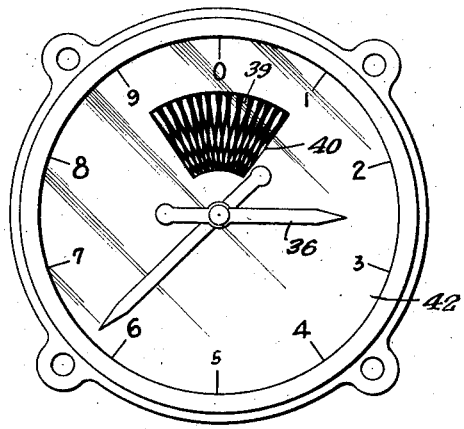
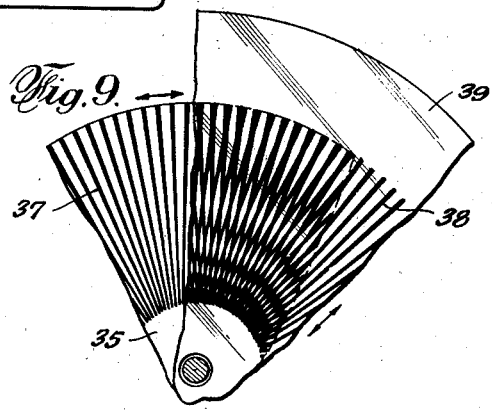
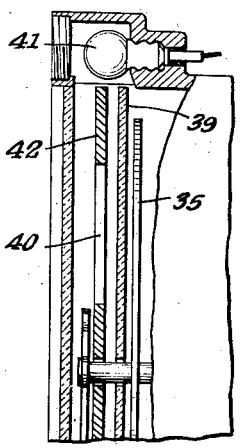
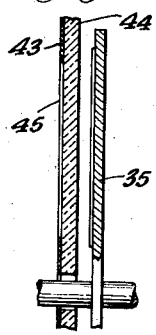
LUIS DE FLOREZ
EMMON BACH
INVENTORS Patented Apr. 15, 1941

2,238,718

UNITED STATES PATENT OFFICE 2,238,718

INDICATING INSTRUMENT

Luis de Florez, New York, and Emmon Bach, Yonkers, N. Y., assignors, by direct and mesne assignments, to National Aviation Research Corporation, New York, N. Y., a corporation of Delaware Application February 23, 1938, Serial No. 191,936

1 Claim. (Cl. 116—129)

The invention relates to means of indicating the reading of instruments.

One of the objects of the invention is to make it possible for one instrument to indicate more than just a single condition or value, such as a condition ancillary or related to the first or main condition.

While adapted to various kinds of indicating instruments, such as gages employed in different industrial uses, the invention is of special importance in aircraft, such as an altimeter to show not only the value in elevation, but to indicate also in clearly readable or even exaggerated or accentuated form, rates of change respecting altitude; or, further for example, a gyro compass for showing not only direction, but rate of turn.

In the accompanying drawings, there are illustrated several practical embodiments of the invention. These however are primarily illustrative in character, the invention being capable of further extension and modification, all within the true spirit and broad scope of the following disclosure and claim.

Fig. 7 is a face view of a combined directional gyro and rate of turn indicator.

Fig. 8 is a face view of a combination rate of change form of altimeter.

Fig. 9 is an enlarged broken detail of the co-operating lined card and screen employed in the latter form of instrument.

Fig. 10 is a broken partly sectional detail illustrating particularly a method of lighting such form of instrument.

Fig. 11 is a broken sectional detail of a modified form of card and combined screen and window element.

The special forms of altimeters shown in Figs. 1 to 4 are made to give indications of rate of change as well as actual values in elevation.

Figure 1:
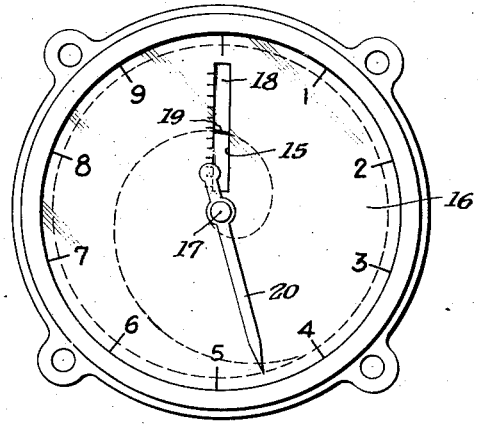
Fig. 1 is a face view of an altimeter having features of the invention incorporated therein.
Figure 2:
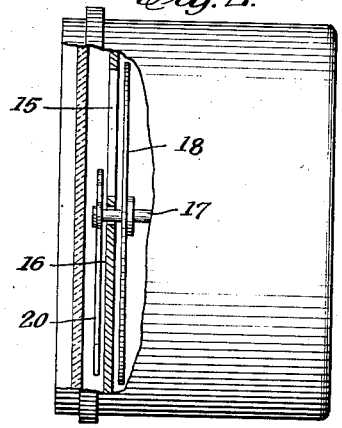
Fig. 2 is a broken side view of the same with parts appearing in section as on substantially the vertical center line of the instrument.

In the first example, Figs. 1 and 2, a relatively narrow vertical slot 15, is provided in the dial 16, and the pointer spindle 17, carries a card 18, back of slot or window 15, bearing on its face a spiral or spirals 19, progressing in an anti-clockwise direction, so that with clockwise movement of the pointer 20, on increase in elevation, the visible portion of the spiral line or lines will rise and with decrease in elevation, the line or lines will lower in the window. This provides an easily readable indication, which does not have to be translated into terms of rising or descending, as is the case with the rotating pointer and one which because of the relative inclination of the spiral across the window, has the effect of indicating to the observer actual rate of change.

Figure 3:
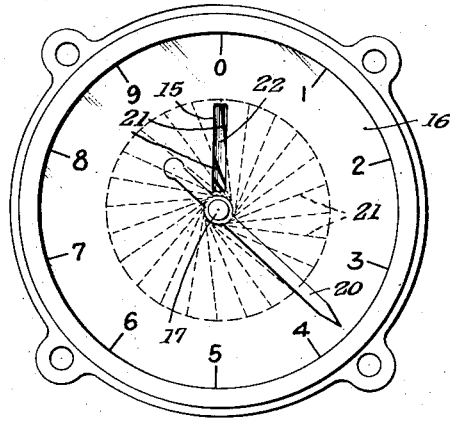
Figs. 3 and 4 are face views of modified forms of altimeters.

To further accentuate the rate of change indication, a construction such as indicated in Fig. 3, may be employed in which the rate of change lines instead of being spiral may be straight lines 21, emanating from points equidistant from the center of the card 22, and slanted back from radial to such extent that relatively slight rotary movement of the pointer and of the card moving therewith will cause an entire line or lines to traverse the full height of the slot or window. The same effect may be produced by having the lines radial and displacing the slot off to one side of a radial position. In the illustration, parts of four such lines are visible and with relatively slight movement of the pointer in the ascending direction, these lines will rise relatively rapidly in the slot. In opposite descending movement, the inclined lines will lower rapidly, providing an instantly and easily readable rate of change indication.

Figure 4:
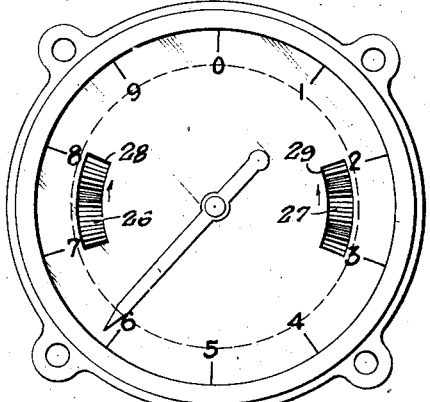
Figure 5:
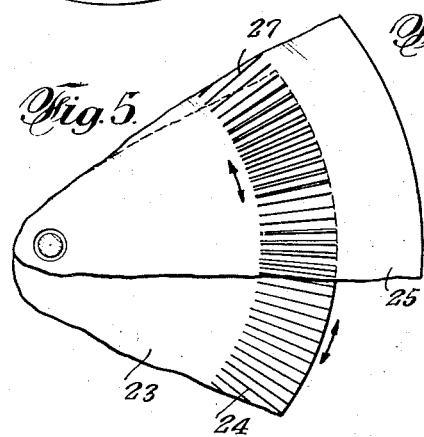
Fig. 5 is an enlarged broken detail of the co-operating, lined screen and card employed in the Fig. 4 form of instrument.
Figure 6:
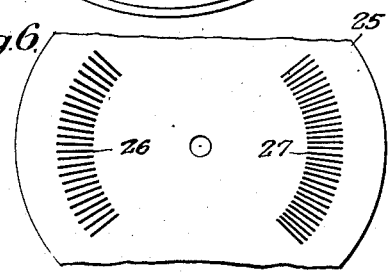
Fig. 6 is a broken detail of the screen element.

Fig. 4 and the detail Figures 5 and 6, illustrate another exemplification, where instead of a lined card working back of a slot or window, the card operates in back of a screen lined in "vernier" relation to provide the effect of shadows shifting upwardly with increase in elevation and lowering with decrease in elevation. This card, 23, is shown as carrying substantially radial lines 24, in back of the screen 25, carrying at opposite sides two sets of radial lines 26, 27, spaced slightly differently from the spacing of the card lines. By way of example, the marks on the indicator card may be fifteen lines to the inch and those on the screen at the left (26) may be fourteen to the inch and those at the right at 27, be sixteen to the inch. In this particular relation, with movement of the pointer in clockwise direction, the shadow effects resulting from these vernier relations will be rising at both sides of the instrument dial through windows 28, 29. Desirably, the lines and spaces between them may be of equal width, so that in some positions, the lines of one, on the card for instance, will absolutely cut off the spaces between the lines of the other element producing black shadows gradually merging into the fully uncovered spaces at opposite sides, where the lines of one register with the lines of the other. With proper proportions, each window may disclose one or a series of such shaded areas or bands, which will rise rapidly with increase of elevation and lower rapidly with decrease in elevation, thus providing rate of change indications at both sides of the dial where the pilot may immediately perceive it, in glancing at the pointer showing elevation.

The greatly amplified indication attained with this vernier relation may be more fully appreciated by consideration of a practical example. The moving card may have fifteen lines in each 15°, that is, one line per degree and the fixed screen sixteen lines in 15°, the lines and spaces on each being of equal width. Light will then pass unobstructed through the spaces of card and screen, where lines and spaces of one coincide with those of the other. Where lines of one coincide with the spaces of the other, no light will pass. Therefore, there will be alternate bands of light and shadows in the interval of 15°. With a movement of the card of 1°, these shadows will move 15°. The direction of shadow movements will depend on the relative movements of the two members, and on which of these members has the greater number of divisions per degree. In this example, with fifteen lines on the card and sixteen on the screen, the shadows at the right hand window 29, will move upwardly with clockwise movement of the card and similar effect is obtained at the left hand window 28, by having the lesser number of lines (14) on the screen at 26, at that window.

In Fig. 7, the invention is shown applied to a directional gyro 30, by ruling the gyro card 31, with vertical lines 32, and locating a vernier screen 33, back of the card, ruled at 34, with a different number of lines. In one particular embodiment, the gyro card is provided with ninety-one lines in 30° of the card and the screen with ninety lines in 30°. In this case, the shadows will move right with right turn and left with left turn at a speed proportionate to the rate of turn, but greatly amplified. Actually, in the example given, one-third degree of turn will effect a 30° movement of the rate indicating shadows. Thus the one instrument serves both as directional gyro and rate of turn indicator.

Figs. 8 and 9 illustrate another embodiment of combination altimeter and rate of climb indicator. The instrument shown is of typical design in that the shorter fast moving pointer 36, makes a complete revolution, while the longer slow moving pointer travels between two divisions of the scale. In this particular embodiment of the invention, the rate of change card 35, is mounted to move with the fast moving pointer 36, and carries lines 37, inclined in the opposite direction from the vernier lines 38, on the screen 39. These lines, where they cross at the window 40, produce the effect of curved shadows, which spread out divergently in fanwise relation, rising quickly with increase in elevation and lowering as rapidly with decrease in elevation, thus giving immediately recognizable rate of change indications.

Different methods of lighting may be employed. Thus by way of example, a light bulb or bulbs 41, Fig. 10 may be placed to illuminate the movable card 35, vernier screen 39 and dial 42.

The dial and vernier screen may be combined in one as indicated in Fig. 11, where the dial 43, is applied to or forms a part of the face of the screen 44, and has formed in it a window 45, through which the screen markings appear, the card with its lines being at the back of the screen and suitably illuminated as described. Instead of the screen serving as a mounting for the dial, the reverse may be true, that is, the dial serve as a mounting for the vernier screen.

While shown applied particularly to altimeters and directional gyros, the invention is applicable to other instruments such as magnetic compasses, air speed indicators, bank indicators and the like, providing as it does a simple and practical means for transforming a value indicating instrument into a rate indicating instrument as well. The amplification of movement indicated by the moving shadows provides also a simple and effective means for accomplishing minute adjustments or relations between two relatively movable parts. Thus very small relative adjustments of two elements, such as card 23 and screen 25, Fig. 5, or card 35 and screen 39, Fig. 9, will be made the more apparent by the magnified movements of the shadows.

Depending upon the nature of the illumination, the card and the screen may both be transparent, such as, with transmitted light from within the rear of the instrument case or the rear element may be translucent, or where the illumination is from a point in front, the rear element may be opaque such as a white card with black lines and the front element be transparent with black lines. While the screen and card have been considered as having different numbers of lines to accomplish the vernier effect, it is possible to use the same number of lines on each where there is sufficient spacing between these lined elements, so that for any included angle of vision, the number of lines embraced on the rear element is somewhat greater than the number seen on the front element.

What is claimed is:

In an altimeter or instrument of like character, the combination of relatively stationary and rotatable screens disposed one in front of the other and composed of substantially radial lines but with the lines of the two screens inclined in opposite directions and crossing in plurality of curved rows producing the effect of dark shadows traveling radially inwardly toward the center and outwardly away from the center on turning of the rotatable screen in reverse directions, instrument mechanism for effecting rotation of said rotatable screen in reverse directions in accordance with conditions affecting said instrument mechanism and a window element exposing the superposed screens at that side of the center of rotation where the radial travel of said shifting shadows is in the direction of movement to afford the indication desired of the instrument.

LUIS DE FLOREZ.
EMMON BACH.